Dec. 15, 1959        F. O. HESS        2,917,299
APPARATUS FOR CONVECTION HEATING
Filed Feb. 9, 1955        2 Sheets-Sheet 1
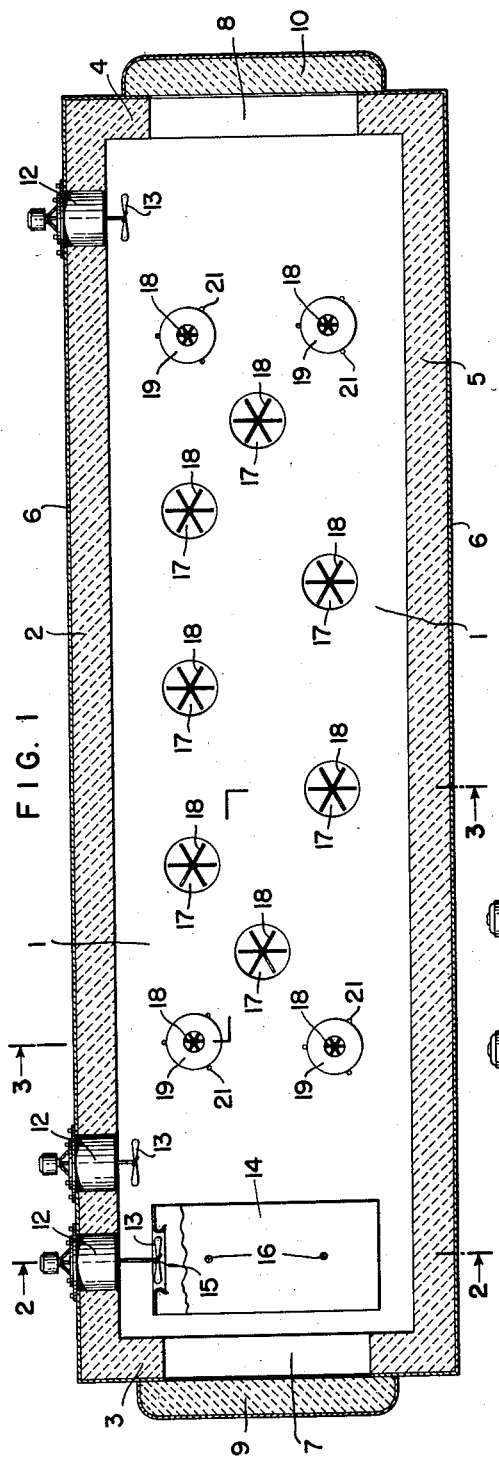
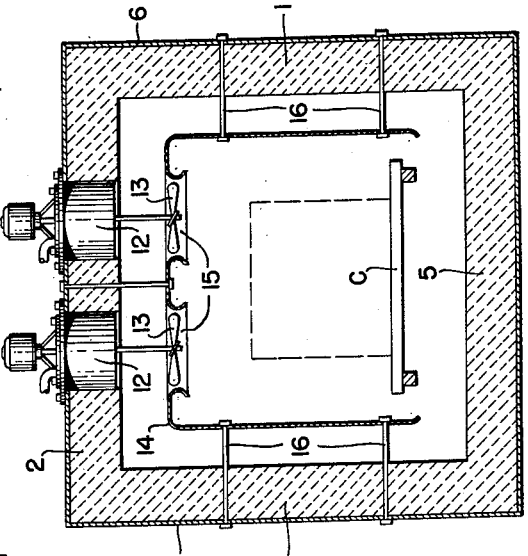
INVENTOR.
FREDERIC O. HESS
BY
ATTORNEY.

Dec. 15, 1959     F. O. HESS     2,917,299
APPARATUS FOR CONVECTION HEATING
Filed Feb. 9, 1955     2 Sheets-Sheet 2

INVENTOR.
FREDERIC O. HESS
BY
ATTORNEY.

United States Patent Office 2,917,299
Patented Dec. 15, 1959

2,917,299
APPARATUS FOR CONVECTION HEATING

Frederic O. Hess, Philadelphia, Pa., assignor to Selas Corporation of America, Philadelphia, Pa., a corporation of Pennsylvania Application February 9, 1955, Serial No. 487,193

9 Claims. (Cl. 263—40)

The present invention relates to a method and apparatus for heating ovens or other enclosures by convection.

There are many applications where it is desirable, if not necessary, to heat enclosures of various types by convection currents. Generally, this requires the introduction of air or other heated gas into the enclosure from an external source. Such introduction is itself undesirable as well as requiring the use of an external duct system. Furthermore, with the apparatus previously available, it was difficult to obtain even distribution of the heated gas or the necessary currents of gas in the enclosure.

It is an object of the invention to provide apparatus for heating the atmosphere in an enclosure, such as an oven, accurately to a desired degree. It is a further object of the invention to provide a means for distributing heat by convection currents in an enclosure in accordance with any predetermined pattern and at any desired velocity.

Another object of the invention is to create hot products of combustion at various points along and in the walls of the enclosure rather than introducing them through a system of ducts and to distribute these products of combustion in any manner that is necessary to obtain the type of heating that is desired.

Another object of the invention is to provide a method of heating an oven by convection which includes circulating the atmosphere within the oven in a predetermined manner to produce the desired type of heating. It is a further object of the invention to provide a method of introducing hot products of combustion into the atmosphere of an oven and to mix these hot products of combustion with the atmosphere therein and to circulate the mixture in a predetermined manner.

It is a still further object of the invention to control the heating of an oven by the circulation of gases therein to produce even heating of objects in the oven and without the production of localized hot spots, unless such production is part of the heating program.

The various objects of the invention are carried out in a novel way by producing in selected locations in the oven walls hot products of combustion and circulating these products in a manner to produce the desired heat pattern. The circulation is obtained by placing a fan, that is individually controlled, in front of each of the above mentioned locations. These fans may be of the type that force the gases in an axial or a radial direction, or some of each may be used. In each case, however, the fans mix the hot products of combustion with the gases forming the furnace atmosphere and circulate them as desired.

By introducing hot products of combustion directly into the oven and controlling the circulation thereof, it is possible to obtain maximum efficiency of heat transfer to the work therein. Furthermore, this mode of operation does away with the introduction of air into the enclosure with its attendant disadvantages. The type of operation obtained with the present invention makes it possible to control accurately practically all of the variables that occur in convection heating of work in an oven or the like. This operation is actually a new form of heating.

The various features of novelty which characterize my invention are pointed out with particularity in the claims annexed to and forming a part of this specification. For a better understanding of the invention, however, its advantages and specific objects attained with its use, reference should be had to the accompanying drawings and descriptive matter in which I have illustrated and described a preferred embodiment of the invention.

In the drawings:

Figure 1 is a sectional view through an oven embodying the present invention;

Figure 2 is a view taken on line 2—2 of Figure 1;

Figure 3 is a section taken on one side wall of the oven on line 3—3 of Figure 1;

Figure 4:
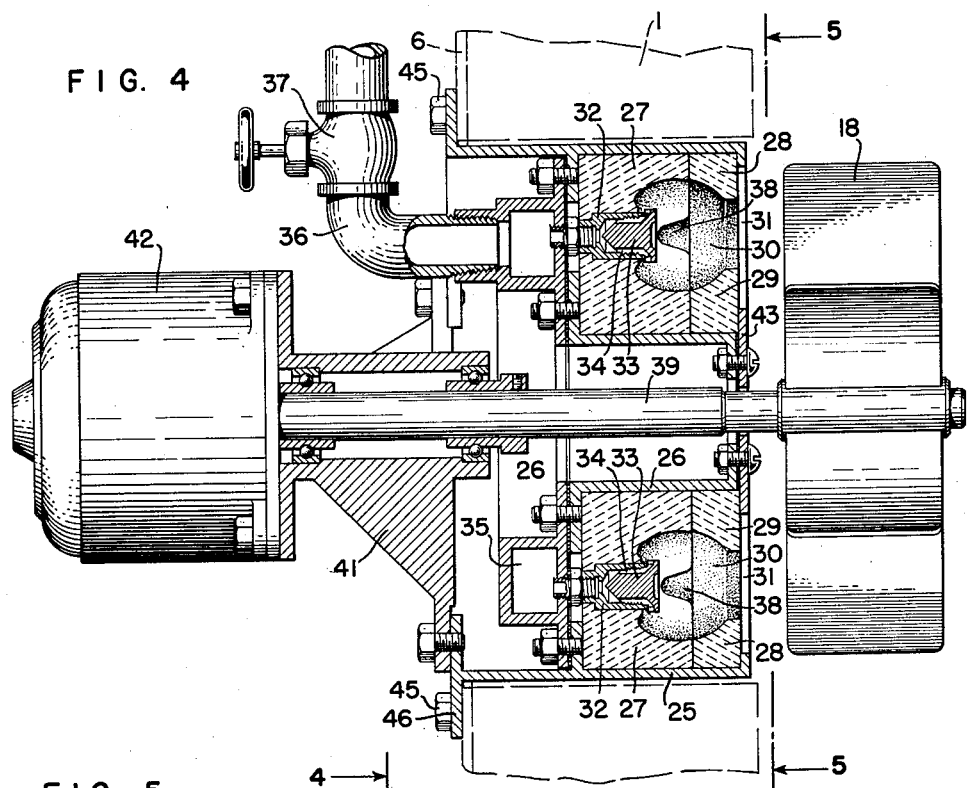
Figure 4 is a section through one of the heating units along line 4—4 of Figure 5.

Referring to the drawings, there is shown an elongated oven or similar structure which can be used for heating, drying or as a lehr, for example, which oven is built in accordance with ordinary furnace practice of refractory material. The oven includes side walls 1, a roof 2, entrance end wall 3, exit end wall 4 and a floor 5. The refractory of the oven is built in accordance with ordinary furnace practice and is backed up in a conventional manner by a sheet of metal 6. The ends 3 and 4 are provided with an entrance 7 and an exit 8 which openings can be covered respectively by doors 9 and 10. It is intended that the work to be heated or dried be moved through the oven in any suitable manner such as by a roller hearth or a walking beam or on a conveyor as shown diagrammatically at C in Figure 3. The manner in which the work is moved through the furnace forms no part of the present invention as long as some conventional means is provided. The doors 9 and 10 can be opened and closed as the work is moving to and from the furnace by any suitable door operating mechanism.

Convection heating or burner units indicated at 12 are located in the roof 2 of the oven immediately adjacent to the entrance 7. Each of these heating units is provided with a fan 13 that is so shaped that a stream of hot products of combustion mixed with the furnace gases will be discharged axially downward from the fan. In order to direct the stream of heated air, there is provided a shield 14 extending adjacent to the sides of the top of the oven. This shield is provided with openings 15 into which the fans 13 extend, so that the air from the fans will be directed in a restricted axial direction downwardly against work as it is moved through the entrance 7 and into the chamber of the oven. This shield is supported in position by means of suitable rods 16 that are anchored in the walls and roof of the oven structure. It will be noted that there are provided to the right of the first group of heating units 12 additional units which are similar thereto but which do not have a shield cooperating therewith. The lack of the shield means that the gases from these units will be directed downwardly in a less restricted manner. Similar units 12 are also located adjacent to the end 4 of the oven and in front of the exit opening 8. The fans 13 connected with these latter heating units will also discharge a stream or sheet of heated air downwardly across the work that is being moved through the oven.

The side walls 1 of the oven are provided at a plurality of locations therein with heating or burner units 17. Immediately in front of and forming a part of each of these heating units is a fan 18 that is adapted to direct heated air in a substantially radial direction. In order to insure that all of the air from these fans will move in a radial direction, the heating units may be provided with annular shields 19 in front of them. If this is the case, the shields are held in position by means of studs 21 which extend from the heating units outwardly, as best shown in Figure 3. The heating units located in the side walls of the furnace move the air in a radial direction, so that the walls of the oven will be blanketed with a layer of hot air that is circulated around and between the work pieces that are moving through the oven.

Figure 5:
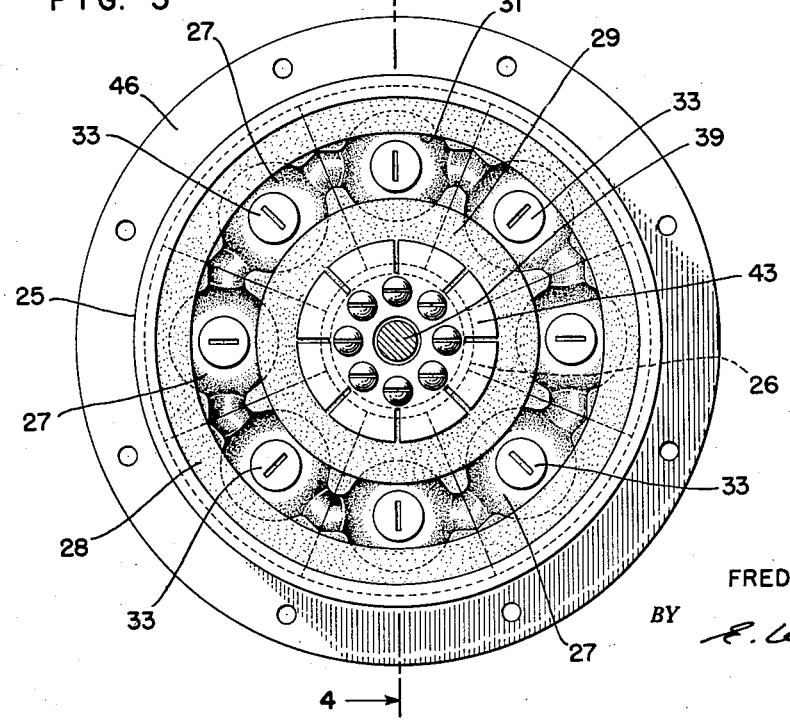
Figure 5 is a front view of a heating unit taken on line 5—5 of Figure 4.

Each of the heating or burner units 12 and 17 is identical in structure except for the type of fan that is used. This fan is designed to discharge the heated air in the desired direction depending upon its location in the oven. If desired, some of the heating units 12 can, of course, utilize radial type fans 18, and some of the heating units 17 in the oven side walls can be provided with axial fans 13. The selection of the fan will depend upon the pattern of convection currents desired. The heating units are shown in detail in Figures 4 and 5. Each unit includes a cylindrical metal shell 25 having an annular chamber 26 formed therein. Located within this chamber are a plurality of ceramic blocks 27, each of which is provided on one face with a cup and an outer annular shield 28 and an inner annular shield 29. The number of blocks 27 will vary with the size of the heating or burner unit. The cups along with the annular shields form a plurality of connected combustion chambers 30 having a restricted annular outlet 31 through which the products of combustion are discharged into the chamber of the oven in an annular sheet. Each block 27 is held in place in the chamber 26 by means of an alloy sleeve 32 extending through an opening in it from the base of the cup to the back of chamber 26 where it is fastened. Each sleeve receives a distributor tip 33 that is provided with grooves 34 around its periphery, which grooves terminate in the combustion space 30 in a generally radial direction.

A fuel and air mixture is supplied through each of the sleeves into the combustion chamber from an annular channel 35 that extends around the back of the chamber 26. Fuel is supplied to the channel 35 through a supply pipe 36 having a valve 37 in it. Each block 27, sleeve 32 and tip 33 forms an individual burner of the type disclosed in Hess Patent 2,215,079. In operation, these burners discharge a combustible mixture of fuel and air from slots 34 of tip 33 in jets directed in a radial direction. The jets of fuel mixture burn along the surface of the cup to heat it to incandescence and thereby increase the heat that is produced in the hot products of combustion. These products are discharged into the oven chamber through the restricted opening 31. In order to insure that each of the supplies of fuel and air that are introduced into the chambers 30 will be ignited, the sides of the cups are provided with depressions 38, so that the fuel from one cup will be ignited from the fuel of the other. This also increases the ease with which each of the burner units may be set into operation.

A fan 13 or 18, as the case may be, is mounted on a fan shaft 39 that extends through the heating unit. This shaft is supported for rotation in a bracket 41 that is bolted to the back of the cylindrical shell 25. Bracket 41 also supports a variable speed motor 42 by means of which the fan is rotated at the desired speed. In order to prevent transfer of heated gas back through the heating unit, there is provided a shield 43 which is bolted to the front of chamber 26 around the fan shaft. This shield also serves to hold the ceramic member 29 in place. The heating unit is fastened in the wall of the oven by means of bolts 45 that extend through a flange 46 on the back of the cylindrical shell 25 into sheet metal 6.

In the operation of the heating or burner unit, a fuel and gas mixture is introduced to the various cups at a rate determined by the adjustment of valve 37. As the products of combustion are produced, they are discharged through the restricted outlet 31 into the fan. From here, they are distributed throughout the furnace chamber in a manner depending upon the type of fan that is used. It will be understood that the amount of heat is determined by the volume of fuel burned, and can be varied by adjusting the valve 37. The velocity as well as the direction of the hot products of combustion can be controlled by the speed of the fan as well as the shape of the blades thereof. The direction of the gas currents can also be predetermined by placing the heating units in the oven walls at various angles to the perpendicular. The fans, of course, also serve to mix the atmosphere of the oven with the hot products of combustion as the latter are distributed throughout the area of the oven. By locating the heating unit properly in the walls of the oven and varying the speed of the fan as well as the amount of fuel that is burned, any desired pattern of the heated gases throughout its area can be obtained. Obviously, if less fuel is being burned, the temperature of the hot products of combustion will be diluted to a greater degree, and, therefore, the temperature of the oven will not be as high as if more products of combustion were discharged therein.

Ovens that are heated by the heating or burner unit described above have a uniform temperature pattern throughout their entire area. The positive flow of the gases produces an extremely accurate heating of the objects in the oven as they are being moved from the entrance to the exit thereof. Ovens of the type to which this application is directed can be used with great efficiency to heat various objects to a temperature up to approximately 1200° F. If temperatures above this value are to be obtained, it is desirable to make the fans of ceramic material that will withstand the heat without deformation.

In some heating applications, it is necessary for the work to be heated and cooled in steps. This is accomplished by having zones of different temperature along the furnace or oven through which the work passes. With heating of the type disclosed herein, zone control of temperature in a furnace is easily accomplished by firing the heating units at different locations along the oven at different rates. The temperature of the different zones can be maintained by either manual or automatic control of the fuel supply to the heating units. The use of individual circulating fans with each heat source makes zone control possible, whereas it cannot be obtained with general recirculating convection ovens.

The term burner as used in the claims appended hereto is intended to refer to the heating or burner units 12 and 17 or the equivalent thereof which serve to produce hot gases and discharge them from specific locations into the oven enclosure.

While in accordance with the provisions of the statutes, I have illustrated and described the best form of embodiment of my invention now known to me it will be apparent to those skilled in the art that changes may be made in the form of the apparatus disclosed without departing from the spirit and scope of the invention as set forth in the appended claims, and that in some cases certain features of my invention may be used to advantage wtihout a corresponding use of other features.

What is claimed is:

1. An oven comprising in combination structure forming an enclosed space in which objects are to be heated by convection heat and including a plurality of walls, a plurality of burners located in one of said walls and operative to discharge hot products of combustion into said space, a fan located in said space immediately in front of each burner, and means to drive said fans individually to distribute the products of combustion through said space in a pattern determined by the speed and configuration of said fans.

2. A furnace comprising a furnace chamber and refractory walls enclosing said chamber and formed with burners opening into said chamber, means to supply fuel to said burners to be burned thereby and discharge hot gases into said chamber, a plurality of fans, means to mount one of said fans in said chamber immediately in front of each of said burners and in the path of the hot gases discharged thereby, and means to drive said fans to direct said hot gases through said chamber and heat objects therein by convection.

3. Heating equipment including in combination structure forming an oven enclosure having walls, each of said walls being provided with a plurality of openings located at spaced points therein, means located in each of said openings to produce heated gases and to introduce said gases into said enclosure, a fan associated with each of said means and located immediately in front thereof to mix the hot gases with the furnace atmosphere and to circulate the same in a predetermined manner, means to adjust individually each of said means to produce, and means to drive individually each of said fans.

4. Heating equipment including in combination structure forming an elongated oven enclosure having walls, a plurality of heating units located at spaced points in said walls, each of said units including means to produce hot products of combustion, and means to introduce said hot products of combustion directly into said enclosure, a fan located in said enclosure and immediately in front of each of said heating units, and means to operate said fans to distribute said hot products of combustion through said enclosure.

5. The combination of claim 4 in which some of said fans are designed to produce an axial flow of hot products of combustion.

6. The combination of claim 4 in which some of said fans are designed to produce a radial flow of hot products of combustion.

7. The combination of claim 6 including a shield in front of some of said fans.

8. Structure forming an oven having walls surrounding a chamber, a plurality of heating units located at spaced points in a wall of said structure, each of said units including means to produce hot products of combustion and to introduce said hot products of combustion in said chamber in an annular sheet, a shaft extending into said chamber concentric with each sheet, a fan in said furnace mounted on each shaft immediately in front of a heating unit, and means to rotate each of said shafts to distribute said hot products of combustion throughout said chamber in a predetermined pattern.

9. Apparatus for heating by convection including structure forming an oven having a plurality of walls enclosing the same, one of said walls having a plurality of openings located at spaced points therein, means forming a combustion chamber in each opening, each chamber having a restricted outlet discharging directly into said oven and through which hot products of combustion pass from said chamber, a plurality of fans, means to mount each of said fans in said oven with a fan immediately in front of each of said outlets, and means to drive individually each of said fans to circulate said hot products of combustion through said oven.

References Cited in the file of this patent

UNITED STATES PATENTS

| | | |
|---|---|---|
| 2,311,350 | Richardson | Feb. 16, 1943 |
| 2,479,102 | Dailey | Aug. 16, 1949 |
| 2,504,320 | Gamble | Apr. 18, 1950 |
| 2,506,646 | Komline | May 9, 1950 |
| 2,673,728 | Grosskloss | Mar. 30, 1954 |
| 2,676,007 | Davis | Apr. 20, 1954 |
| 2,694,157 | Cone | Nov. 9, 1954 |

FOREIGN PATENTS

| | | |
|---|---|---|
| 925,868 | France | Apr. 8, 1947 |